United States Patent
Aweya et al.

(10) Patent No.: US 6,788,697 B1
(45) Date of Patent: Sep. 7, 2004

(54) BUFFER MANAGEMENT SCHEME EMPLOYING DYNAMIC THRESHOLDS

(75) Inventors: James Aweya, Nepean (CA); Michel Ouellette, Rockland (CA); Delfin Y. Montuno, Kanata (CA)

(73) Assignee: Nortel Networks Limited, Quebec (CA)

(*) Notice: Subject to any disclaimer, the term of this patent is extended or adjusted under 35 U.S.C. 154(b) by 776 days.

(21) Appl. No.: 09/635,898

(22) Filed: Aug. 11, 2000

Related U.S. Application Data

(63) Continuation-in-part of application No. 09/455,455, filed on Dec. 6, 1999, now Pat. No. 6,690,645.

(51) Int. Cl.[7] ............................................. H04L 12/26
(52) U.S. Cl. ....................... 370/412; 370/252; 370/235; 709/229; 709/234
(58) Field of Search ......................... 370/252, 229–237, 370/411–419, 395.41, 395.43; 709/214, 215, 229, 234, 235

(56) References Cited

U.S. PATENT DOCUMENTS

| | | | | |
|---|---|---|---|---|
| 5,541,912 A | * | 7/1996 | Choudhury et al. | 370/412 |
| 6,404,768 B1 | * | 6/2002 | Basak et al. | 370/412 |
| 6,424,622 B1 | * | 7/2002 | Fan et al. | 370/230 |
| 6,535,484 B1 | * | 3/2003 | Hughes et al. | 370/412 |

OTHER PUBLICATIONS

Choudhury, Dynamic threshold for multiple loss priorities, 1997, IEEE, pp. 272–281.*

Gerard J. Foschini et al., *"Sharing Memory Optimally"*, IEEE Transactions on Communications, vol. COM–31, No. 3, Mar. 1983, pp. 352–360.

Farouk Kamoun et al., *"Analysis of Shared Finite Storage in a Computer Network Node Environment Under General Traffic Conditions"*, IEEE Transactions on Communications, vol. COM–28, No. 7, Jul. 1980, pp. 992–1003.

Guy Latouche, *"Exponential Servers Sharing a Finite Storage: Comparison of Space Allocation Policies"*, IEEE Transactions on Communications, vol. COM–28, No. 6, Jun. 1980, pp. 910–915.

Abhijit K. Choudhury et al., *"Dynamic Queue Length Thresholds for Shared–Memory Packet Switches"*, IEEE/ACM Transactions of Networking, vol. 6, No. 2, Apr. 1998, pp. 130–140.

(List continued on next page.)

*Primary Examiner*—Steven Nguyen
(74) *Attorney, Agent, or Firm*—Hunton & Williams LLP

(57) ABSTRACT

An improved buffer management process is disclosed wherein the buffer is shared among a plurality of packet queues. The improved buffer management process comprises computing a common queue threshold value based upon the aggregate size of the plurality of packet queues and a predetermined buffer threshold value. The common queue threshold value is then used to manage the size of each of the plurality of packet queues and thereby manage the buffer.

28 Claims, 8 Drawing Sheets

OTHER PUBLICATIONS

Ruixue Fan et al., "*An Optimal Buffer Management Scheme with Dynamic Thresholds*", Global Telecommunications Conference—Globecom '99, General Conference (Part B), pp. 631–637.

Van Jacobson, "*Congestion Avoidance and Control*" paper, University of California, Lawrence Berkeley Laboratory, 1988, pp. 314–329.

W. Stevens, "*TCP Slow Start, Congestion Avoidance, Fast Retransmit, and Fast Recovery Algorithms*" Memo to the Network Working Group, Jan. 1997, pp. 1–6.

B. Braden et al., "*Recommendations on Queue Manangement and Congestion Avoidance in the Internet*" Memo to the Network Working Group, Apr. 1998, pp. 1–17.

Sally Floyd et al., "*Random Early Detection Gateways for Congestion Avoidance*", IEEE/ACM Transactions on Networking, vol. 1, No. 4, Aug. 1993, pp. 397–413.

Sally Floyd, "*TCP and Explicit Congestion Notification*" paper, University of California, Lawrence Berkeley Laboratory,.

Hong–Yi Tzeng et al., "*Performance of TCP over UBR in ATM with EPD and Virtual Queuing Techniques*", Computer Communications 21, 1998, pp. 1070–1079.

Rohit Goyal et al., "*Improving the Performance of TCP Over the ATM–UBR Service*" paper, Ohio State University, Department of Computer and Information Science, pp. 1–23.

* cited by examiner

BUFFER MANAGEMENT SCHEME EMPLOYING DYNAMIC THRESHOLDS

CROSS-REFERENCE TO RELATED APPLICATIONS

This patent application is a continuation-in-part application of U.S. patent application Ser. No. 09/455,445 (Client Reference No. 10407ROUS01U), filed Dec. 6, 1999, now U.S. Pat. No. 6,690,645 issued Feb. 10, 2004, which is hereby incorporated by reference herein in its entirety.

FIELD OF THE INVENTION

The present invention relates generally to buffer management and, more particularly, to an improved buffer management scheme employing dynamic thresholds.

BACKGROUND OF THE INVENTION

Switch architectures use buffering mechanisms to accommodate packets whose service has been delayed due to contention for bandwidth or temporary congestion within the switch. Shared buffer memory switches are popular for their efficient buffer utilization. By sharing the buffer, for instance, among all output ports, and taking advantage of the statistical multiplexing on input traffic, shared-memory switches are able to achieve the same packet delay and loss performance with a smaller pool of buffers per port when compared with switches of other types. Such a reduction in buffer size is even more significant for bursty traffic and non-uniform traffic load at the switch ports. Thus, shared-memory switches have become very popular, since they can achieve a given loss probability requirement with the smallest amount of total memory.

However, as is well known, management and control of such a shared resource is a challenging task because of the conflicting objectives of maximizing buffer utilization and increasing the degree of statistical multiplexing, on one hand, and providing heterogeneous loss requirements and isolation to connections admitted into the system, on the other hand. Shared-memory switches without good buffer management procedures may not perform well under overload conditions, especially in regard to fairness. The statistical sharing of the buffer memory introduces the possibility of a small group of output ports hogging most of the memory, preventing packets destined for less utilized ports from gaining their fair shares of memory or even blocked completely.

One conventional solution to the above-stated problems is to set some restrictions on the amount of buffering a port can use (e.g., each queue has a threshold for the maximum number of buffers it can access, each queue is guaranteed a minimum number of buffers, etc.) A number of threshold-setting methods have been proposed for buffer management. These methods can be broadly categorized as static threshold methods (e.g., see G. J. Foschini, and B. Gopinath, "Sharing Memory Optimally," *IEEE Trans. Communications*, Vol. 3, March, 1983, pp. 352–360; F. Kamoun and L. Kleinrock, "Analysis of Shared Finite Storage in a Computer Network ode Environment under General Traffic Conditions," *IEEE Trans. Communications*, Vol. 28, July, 1980, pp. 992–1003; and G. Latouche, "Exponential Servers Sharing a Finite Storage: Comparison of Space Allocation Policies," *IEEE Trans. Communications*, Vol. 28, June, 1980, pp. 992–1003), and dynamic threshold methods (e.g., see A. K. Choudhury and E. L. Hahne, "Dynamic Queue Length Thresholds in a Shared Memory ATM Switch," *Proc. IEEE INFOCOM' 96*, Vol. 2, March, 1996, pp. 679–687; and R. Fan, A. Ishii, B. Mark, G. Ramamurthy, and Q. Ren, "An Optimal Buffer Management Scheme with Dynamic Thresholds," *Proc. IEEE GLOBECOM' 99*, December, 1999, pp. 631–637).

In a static threshold method, each queue is only allowed to grow up to a maximum length which is statically defined. Arriving packets destined to a queue whose length is equal to their threshold are discarded. With different settings of thresholds, the static threshold method varies from complete sharing (e.g., the individual threshold is set to full buffer capacity to achieve maximal utilization but no fairness among different ports) to complete partitioning (e.g., buffer capacity is completely partitioned to ensure fairness among different ports but could lead to least usage efficiency). Usually a good static threshold scheme has to take a good compromise between efficiency and fairness of buffer sharing. If the sum of the thresholds is close or equal to the total buffer size, static thresholding becomes very restrictive in the use of the available buffers, and results in low buffer utilization (the special case where the sum of the thresholds adds up to the total buffer size is referred to as complete partitioning). On the other hand, if the sum of the thresholds is much larger than the total buffer size, sharing is achieved, but the scheme does not provide minimum allocations and suffers from potential starvation. A variation of this scheme, referred to as static thresholding with minimum allocations, divides the total buffer space in two portions and implements complete partitioning in one of them to guarantee a minimum allocation. Still, however, because of the static nature of the scheme, the tradeoff between sharing and isolation that can be achieved may not be optimal.

In a dynamic threshold method, buffer thresholds are dynamically adjusted according to the changing traffic load. A dynamic threshold method intends to allow congested queues to gain access to buffers not utilized by lightly loaded queues as long as their queues do not exceed their fair share of the memory (i.e., the dynamic threshold). Therefore, a good dynamic threshold scheme should improve the overall switch buffer utilization while ensuring fair sharing of buffer memory among different queues. In general, dynamic threshold schemes require more processing and are more appropriate for buffer management of queues where traffic load may fluctuate substantially (although only lasting for a short time span).

Despite the above-described benefits of both static threshold methods and dynamic threshold methods, merely using an efficient and fair buffer allocation scheme in a shared-memory architecture, without appropriate queue management, does not necessarily lead to improved performance. That is, some form of active queue management is needed even for routers that use efficient dynamic buffer allocation mechanisms. This is because dynamic buffer allocation algorithms by themselves do nothing to control the overall queue size of individual queues (i.e., there is no direct control on the lengths of the individual queues). For example, while dynamic buffer allocation mechanisms can allocate buffer memory efficiently and fairly among output ports, fair buffer allocation does not necessarily result in efficient and fair buffer usage, particularly for transmission control protocol (TCP) (e.g., see V. Jacobson, "Congestion Avoidance and Control," *Proc. ACM SIGCOMM' 88*, 1988, pp. 314–329; and W. Stevens, "TCP Slow Start, Congestion Avoidance, Fast Retransmit, and Fast Recovery Algorithms," *IETF RFC 2001*, January, 1997). Thus, active queue management is needed to control the overall queue sizes so that arriving bursts can be accommodated without dropping packets unnecessarily (e.g., see B. Braden et al., "Recommendation on Queue Management and Congestion Avoidance in the Internet," *IETF RFC* 2309, April, 1998; and S. Floyd and V. Jacobson, "Random Early Detection Gateways for Congestion Avoidance," *IEEE/ACM Trans. Networking*, Vol. 1, No. 4, August, 1993, pp. 397–413).

The basic idea behind active queue management schemes such as, for example, random early detection (RED), is to detect incipient congestion early and to convey congestion notification to the end-systems, allowing them to reduce their transmission rates before queue overflow and sustained packet loss occur. In addition, active queue management can be used to control the queue sizes for each individual port so that they do not experience unnecessarily high delays.

In the basic RED scheme, as well as in improvements thereto such as described in the above-referenced related U.S. patent application Ser. No. 09/455,445, filed Dec. 6, 1999, a queue length average is maintained and used, along with a number of queue thresholds, to detect congestion. If congestion is detected, incoming packets are dropped (or marked, e.g., see S. Floyd, "TCP and Explicit Congestion Notification", *ACM Computer Communication Review*, Vol. 24, No. 5, October, 1994, pp. 10–23) in a random probabilistic manner where the probability is a function of recent buffer fill history. The objective is to provide a more equitable distribution of packet loss among the different flows, avoid the synchronization of flows, and, at the same time, improve the utilization of the network.

Despite the benefits associated with the above-described basic and improved RED schemes, there are still shortcomings associated therewith. One such shortcoming is in the setting of the queue thresholds. That is, the setting of the queue thresholds in a RED scheme in a shared-memory architecture can be problematic because the required thresholds for good and fair buffer sharing among switch ports is dependent on the number of TCP connections using the buffer. Thus, there remains a need for enhancing the effectiveness of a RED scheme in a shared-memory architecture by dynamically changing the threshold settings as the number of connections (and the system load) changes.

SUMMARY OF THE INVENTION

According to the present invention, an improved buffer management scheme is provided wherein the buffer is shared among a plurality of packet queues. In a preferred embodiment, the improvement is realized by dynamically computing a common queue threshold value based upon the aggregate size of the plurality of packet queues and a predetermined buffer threshold value. The common queue threshold value is then used to manage the size of each of the plurality of packet queues and thereby manage the buffer.

In accordance with other aspects of the present invention, the improvement further comprises recomputing the common queue threshold value at predetermined time intervals.

In accordance with further aspects of the present invention, the improvement further comprises computing a packet drop probability for each of the plurality of packet queues based upon the common queue threshold value.

In accordance with still further aspects of the present invention, a predetermined increment threshold value is used to compute the common queue threshold value. That is, the computed common queue threshold value is the smaller of the sum of a current common queue threshold value and the predetermined increment threshold value or the predetermined buffer threshold value if the aggregate size of the plurality of packet queues is less than the predetermined buffer threshold value. Alternatively, the computed common queue threshold value is the larger of the difference of a current common queue threshold value and the predetermined increment threshold value or a predetermined minimum queue threshold value if the aggregate size of the plurality of packet queues is greater than or equal to the predetermined buffer threshold value.

The present invention will now be described in more detail with reference to exemplary embodiments thereof as shown in the appended drawings. While the present invention is described below with reference to preferred embodiments, it should be understood that the present invention is not limited thereto. Those of ordinary skill in the art having access to the teachings herein will recognize additional implementations, modifications, and embodiments, as well as other fields of use, which are within the scope of the present invention as disclosed and claimed herein, and with respect to which the present invention could be of significant utility.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENT(S)

Figure 1:
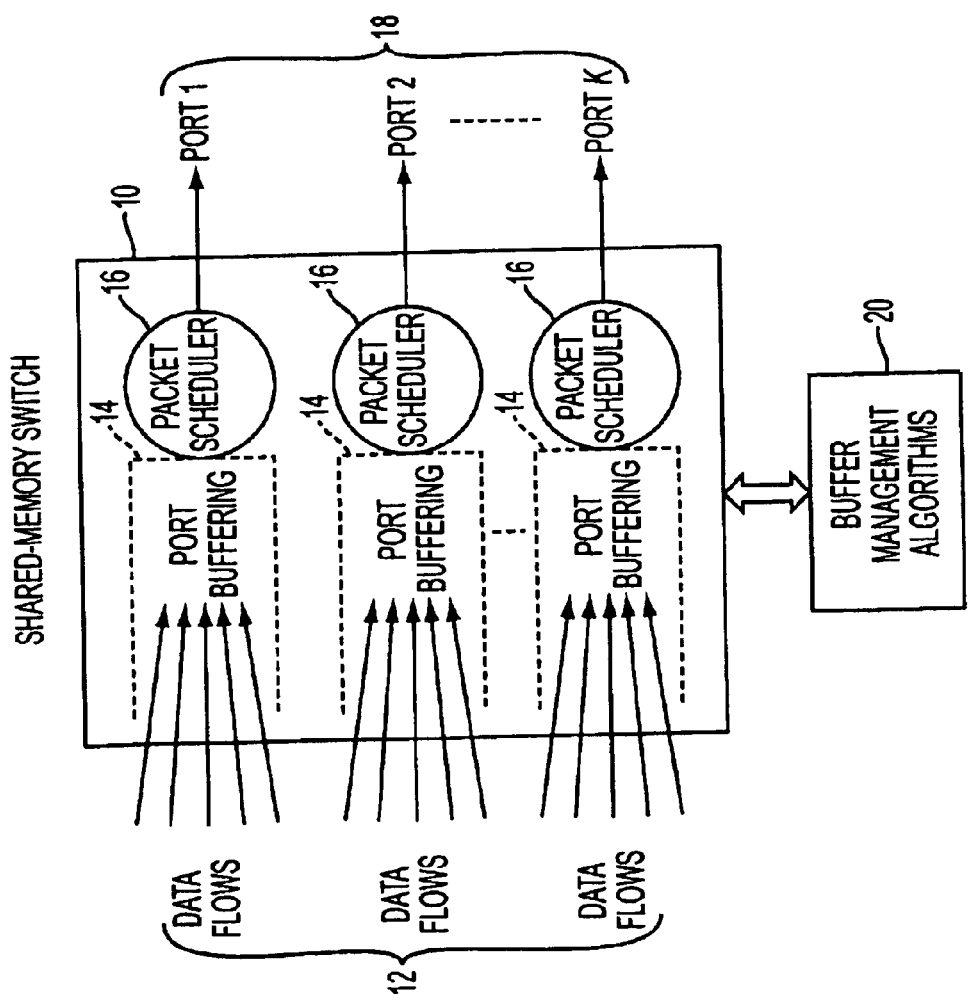
FIG. 1 shows a shared-memory switch, within which the present invention buffer management scheme may be utilized, wherein buffer space is shared among switch ports.

At the outset, it is appropriate to describe the architectural frameworks (i.e., the shared-memory architectures) within which the present invention buffer management scheme may be utilized. That is, the present invention buffer management scheme may be utilized with a buffer that is organized into multiple queues in several different ways. For example, referring to FIG. 1, there is shown a shared-memory switch 10 wherein buffer space is shared among switch ports. The shared-memory switch 10 comprises a first plurality of input ports 12 having data flows, a second plurality of switch port buffers 14, a corresponding second plurality of packet schedulers 16, a corresponding second plurality of output ports 18, and a buffer management controller 20, the functions of which will be described below.

Figure 2A:
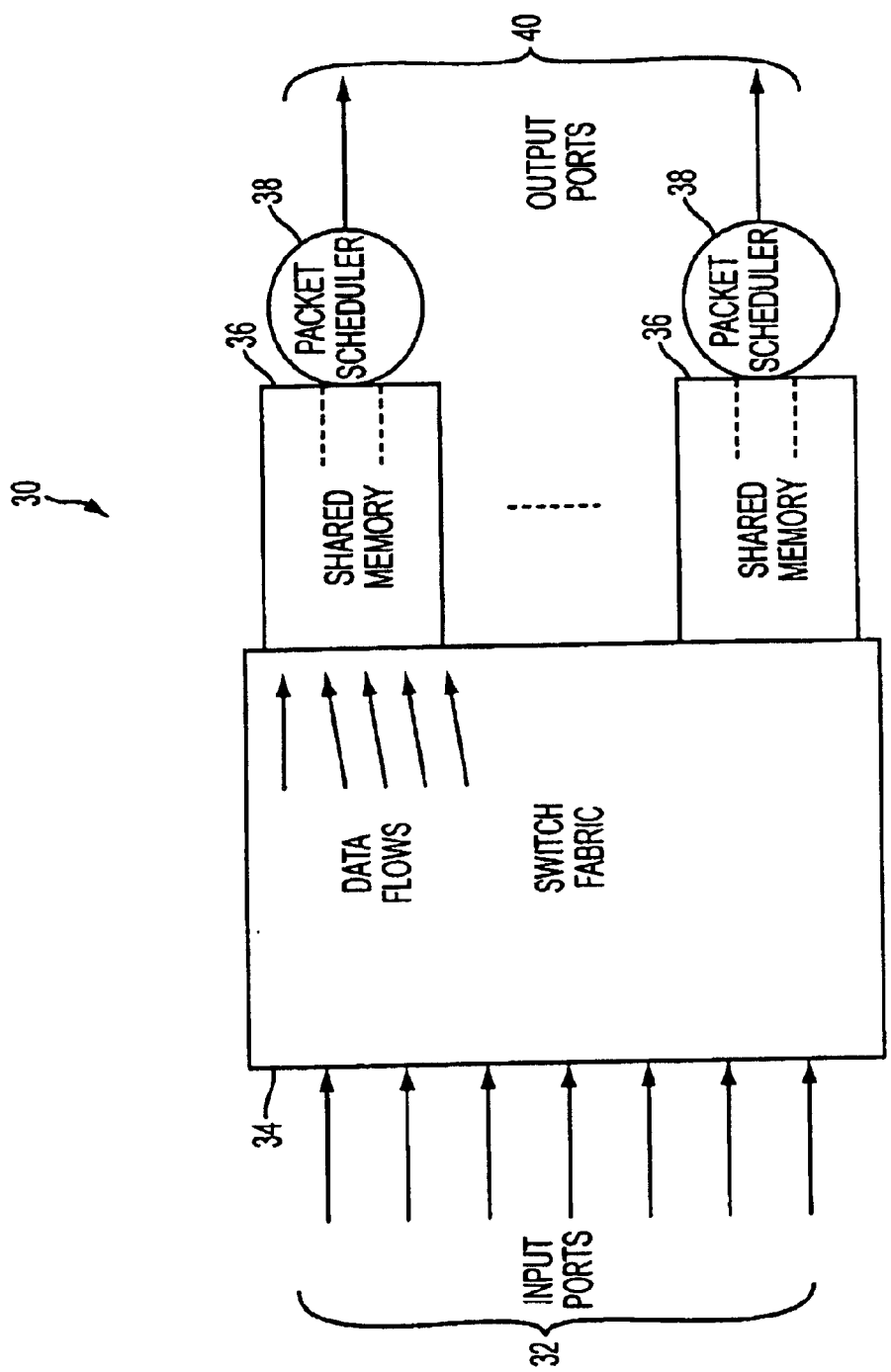
FIG. 2a shows a switch, within which the present invention buffer management scheme may be utilized, wherein buffer space is shared among a number of service classes at each output port.

Referring to FIG. 2a, there is shown a switch 30 wherein buffer space is shared among a number of service classes at each output port. That is, the switch 30 has output queuing using a shared buffer wherein packets destined for a particular output port are stored according to service class in the shared buffer. The switch 30 comprises a first plurality of input ports 32 having data flows, a switch fabric 34, a second plurality of output port buffers 36, a corresponding second plurality of packet schedulers 38, a corresponding second plurality of output ports 40, and a buffer management controller 42 (see FIG. 2b), the functions of which will be described below.

Figure 2B:
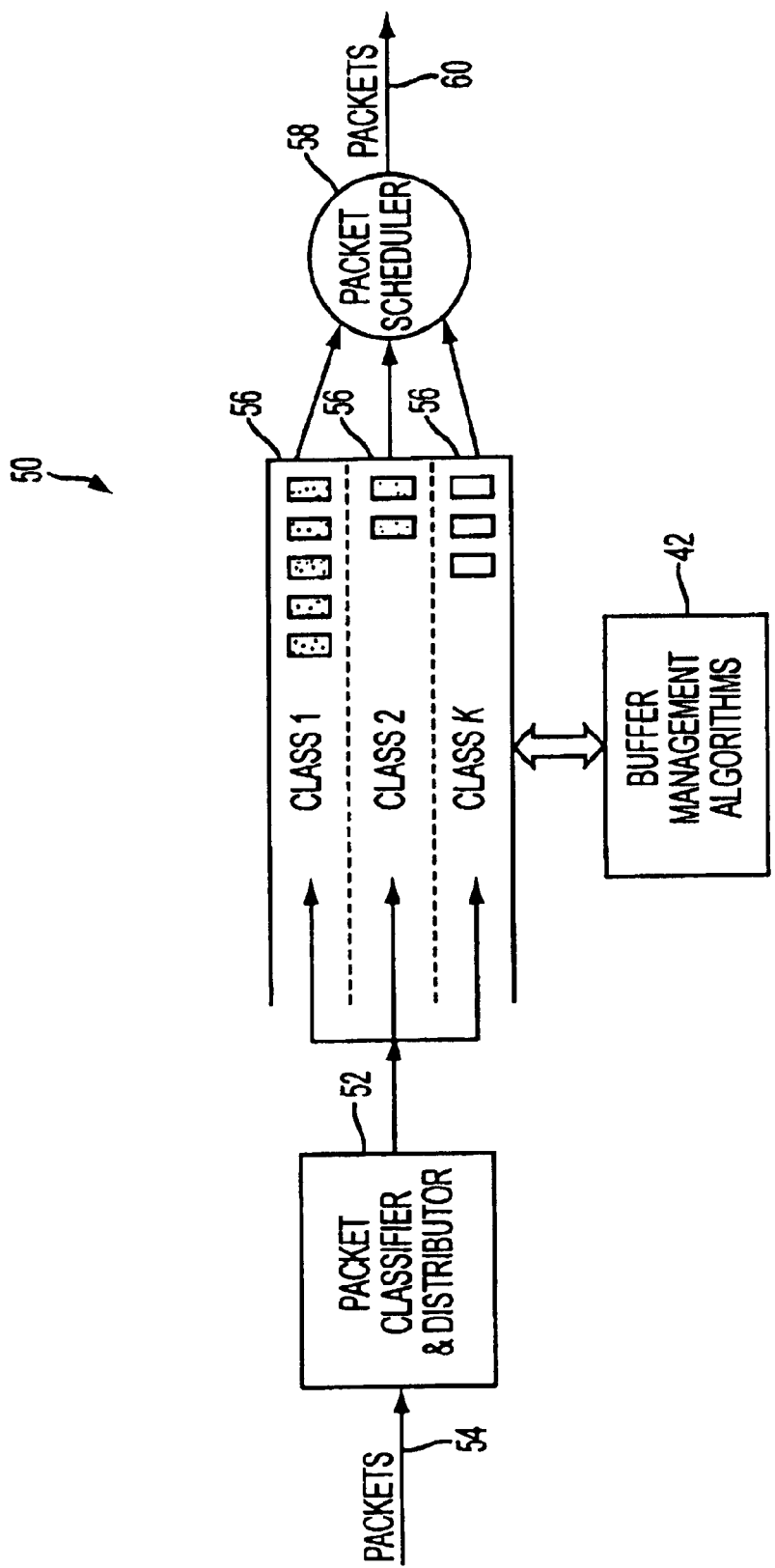
FIG. 2b shows an output port, within which the present invention buffer management scheme may be utilized, wherein buffer space is shared among sub-queues or data flows for a number of service classes.

Referring to FIG. 2b, there is shown an output port 50 wherein buffer space is shared among sub-queues or data flows for a number of service classes. The output port 50 comprises a packet classifier and distributor 52 for receiving packets 54, a plurality of queues 56 for receiving the classified and distributed packets, a packet scheduler 58, an output link 60, and a buffer management controller 42, the functions of which will be described below.

Each of the above-described shared-memory architectures uses a buffer allocation algorithm to efficiently allocate available buffer space within buffer levels to flows or connections. Also, each of the above-described shared-memory architectures can be utilized in a network device such as, for example, a switch or a router. That is, a network device such as, for example, a switch or a router, can utilize any of the above-described shared-memory architectures so as to employ a shared-memory buffering scheme with dynamic allocation of packet buffer memory to individual ports (or service classes).

In general, when using a buffer allocation algorithm, incoming packets are deposited into "empty" buffers that are kept in a common pool available to all ports (or service classes). Buffer identifiers, or "pointers", are then dynamically "linked" into appropriate transmit queues and the packets are transmitted when allowed by the output ports. These are logical queues which are associated with each port (or service class). An incoming packet is stored in an empty buffer, but if there are no more empty buffers available, the packet is dropped. The switch also keeps track of the total number of buffers consumed by a port (or service class) at any time and an incoming packet is dropped when a port (or class) has exceeded its buffer memory quota.

The shared-memory architecture optimizes buffer utilization by allowing buffers to be dynamically allocated to ports (or service classes) as needed and can avoid packet duplication for multicast and broadcast packets. A packet forwarding mechanism maintains a map of output ports through which a packet needs to be transmitted, and retains the buffer where the packet is being stored until the packet has been forwarded through all appropriate output ports. That is, a packet remains in the same, single memory location until it has been correctly forwarded by all output ports. Once the packet is successfully transmitted through all appropriate output ports, the buffer is freed and returned to the "empty" buffer pool.

Depending on the buffer allocation scheme, a switch can enforce a limit on the amount of packet buffer memory that may be queued for any one output port at any instant of time in order to prevent one single output port from monopolizing all available buffers and starving out other output ports. If an output port already has more than this amount of buffer memory allocated to it, any excess buffer memory is typically freed up for use by other output ports.

The present invention buffer management scheme can be utilized in any of the above-described shared-memory architectures (i.e., at the switch level, port level, and/or service class level). Thus, the present invention buffer management scheme is not limited to any one of the above-described shared-memory architectures, but may be employed in all.

Figure 3:
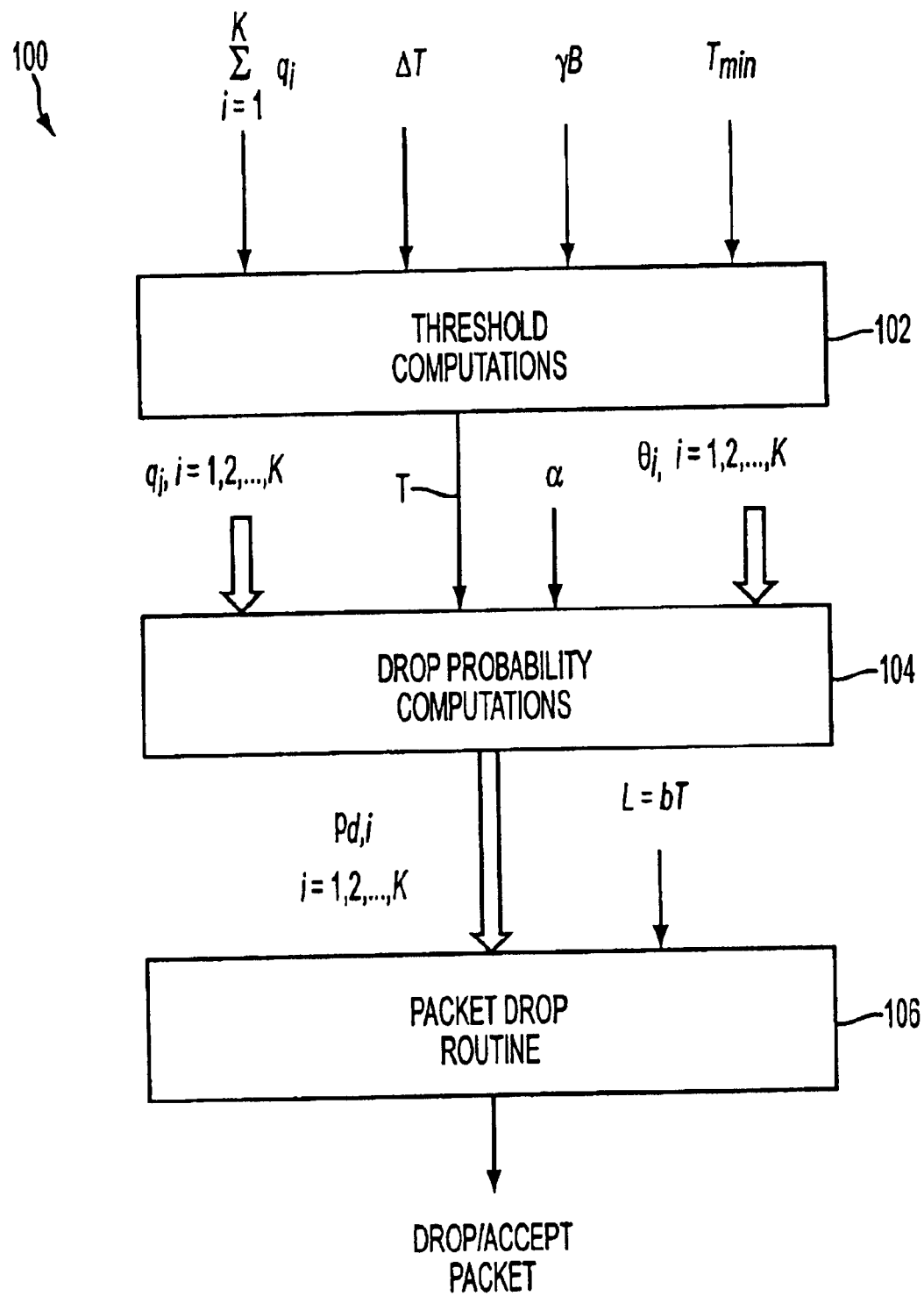
FIG. 3 shows a high level representation of a buffer management scheme in accordance with the present invention.

Referring to FIG. 3, there is shown a high level representation of a buffer management scheme 100 in accordance with the present invention. As shown in FIG. 3, the buffer management scheme 100 comprises three primary components: a dynamic threshold computation component 102, a packet drop probability computation component 104, and a packet drop routine 106. As described in detail below, based upon the functions of each of these three primary components, a determination is made as to whether a received data packet is dropped or accepted. The function of the dynamic threshold computation component 102 will be described first, followed by a description of the packet drop probability computation component 104, and then a description of the packet drop routine 106.

For purposes of the following detailed description, it is to be assumed that the shared-memory architecture within which the buffer management scheme 100 is employed has a buffer of size B packets shared by K ports at the switch level, or K service classes at the port or class level. It is also to be assumed that $q_i(n)$ denotes the queue size of port (or class) i at discrete time n, wherein i=1,2, ..., K. The queue size, $q_i(n)$, may fluctuate as the incoming traffic load and/or the service bandwidth allocated at port (or class) i vary with time. Thus, to ensure fair sharing of the buffer space B, it is further assumed that each port (or class) should be able to access at least B/K buffers (i.e., the fair share) when it is overloaded. On the other hand, to efficiently utilize the buffer (i.e., to achieve maximum buffer sharing), an overloaded port (or class) must be able to use any available buffer memory when such buffers are not used by other ports (or classes). Thus, a common threshold, T(n), is used for all K ports (or classes). At discrete time instances, the dynamic threshold computations are as follows. At initialization:

$$T \leftarrow \frac{\gamma B}{K}$$

After every interval of $\Delta s$ time units (in seconds), compute:

$$T \leftarrow \begin{cases} \min\{T + \Delta T, \gamma B\}, & \text{if } \sum_{i=1}^{K} q_i(n) < \gamma B \\ \max\{T - \Delta T, T_{\min}\}, & \text{if } \sum_{i=1}^{K} q_i(n) \geq \gamma B. \end{cases}$$

The parameter $T_{min} \geq 0$ represents the minimum buffer threshold statically set for each port (or service class). This is a user-configurable per-port (or per-class) quota to allow the network manager to assign the minimum number of buffers that each port (or class) can consume, thus preventing starvation of buffer resources. Through this, the dynamic buffering scheme allows the system to adapt intelligently to various traffic conditions and gives the network manager the ability to fine tune the network to different traffic characteristics. The step size, $\Delta T > 0$, controls the rate at which the buffer threshold changes. The buffer space, $(1-\gamma)B$, is the slack buffer capacity used to absorb incoming traffic bursts. Thus, the parameter $\gamma \in (0,1]$ controls the extent to which the buffer space, B, is completely or partially shared: γ=1 results in complete sharing and 0<γ<1 in partial sharing. If all ports (or classes) are active, the slack buffer capacity per port (or class) is (1−γ)B/K.

In steady-state, the common threshold, T, is given by T=γB/$N_a$, where 1≤$N_a$≤K is the effective number of active ports (or classes) in the system. In other words, the effective number of active ports (or classes) at a given time instant is given by $N_a$=γB/T.

Figure 4:
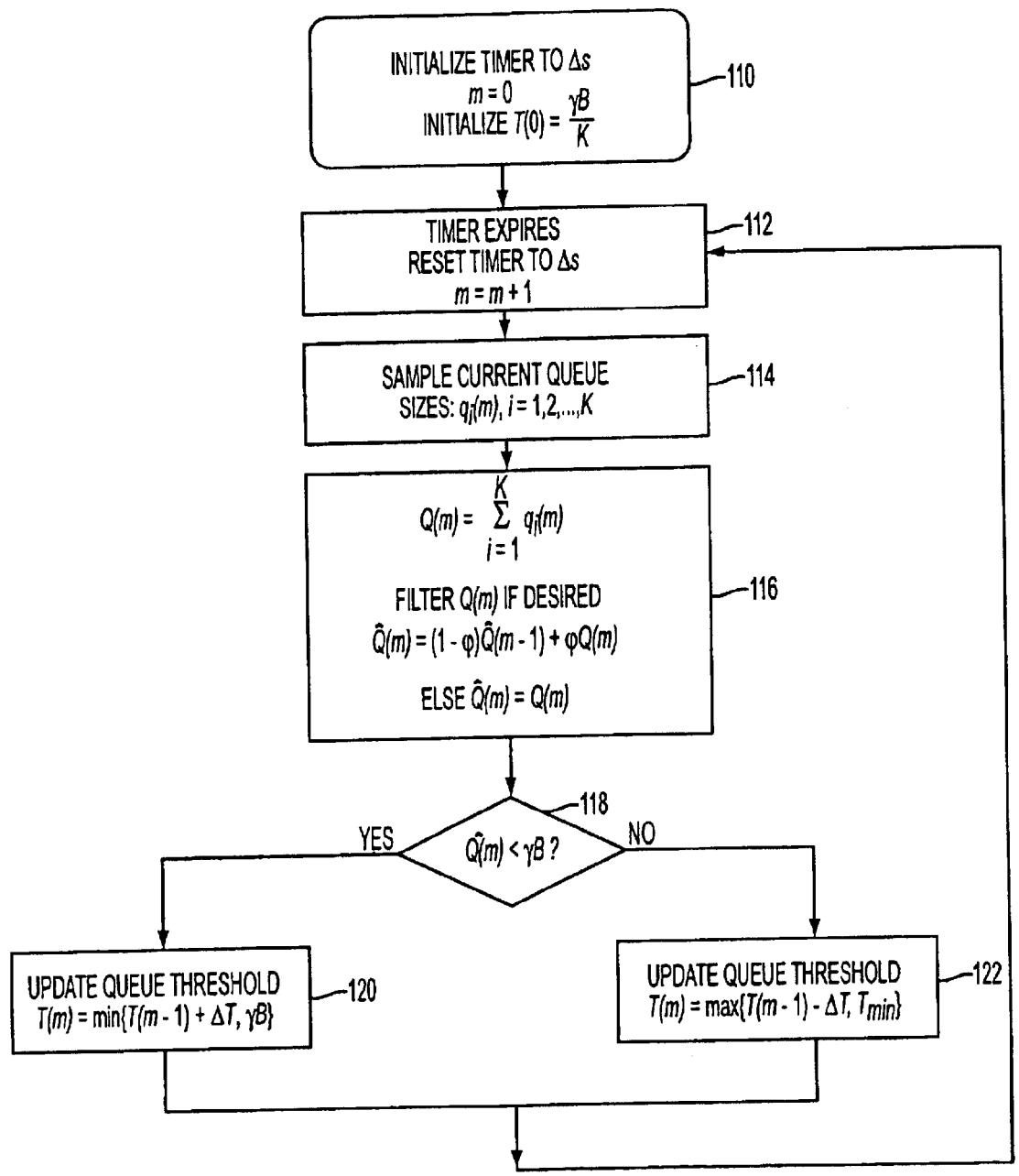
FIG. 4 is a flowchart illustrating the steps involved in the computation of dynamic buffer thresholds in accordance with the present invention.

The computation of the dynamic buffer thresholds is illustrated in FIG. 4. In step 110, the timer and the threshold are initialized. In step 112, the timer expires and the timer is reset. In step 114, the current queue sizes are sampled. In step 116, the current queue sizes are summed and filtered (if desired). In step 118, a decision is made as to whether the (filtered) sum of all of the current queue sizes is less than the predetermined buffer threshold, γB. If yes, in step 120, the previous common queue threshold is incremented by an amount equal to the step size, ΔT, but is not allowed to exceed the predetermined buffer threshold, γB. If no, in step 122, the previous common queue threshold is decremented by an amount equal to the step size, ΔT, but is not allowed to drop below the minimum buffer threshold, $T_{min}$.

The main concepts behind the function of the packet drop probability computation component 104 are described in the above-referenced related U.S. patent application Ser. No. 09/455,445, filed Dec. 6, 1999, which is incorporated by reference herein. This above-referenced related patent application describes a mechanism that uses a simple control-theoretic approach to randomly discard packets with a load-dependent probability when a buffer in a network device gets congested. The mechanism maintains the average queue size close to a predetermined threshold, but allows transient traffic bursts to be queued without unnecessary packet drops. Since the above-referenced related patent application is incorporated by reference herein, this detailed description will only include a brief overview of the functions of the packet drop probability computation component 104 that are required for an understanding of the buffer management scheme 100.

The packet drop algorithm described in the above-referenced related patent application is a mechanism for congestion control (e.g., controlling the queue size) at a line interface of a network device. The algorithm controls congestion by randomly dropping packets with a probability, $p_d$, which constitutes a signal to applications (TCP sources) to reduce their sending rate. The algorithm makes its decision of dropping or accepting an incoming packet so that the queue occupancy level is kept at a given target level, thereby eliminating buffer underflow and overflow as much as possible.

The actual queue size in the switch or router is assumed to be sampled every Δt units of time (seconds), and the packet drop controller provides a new value of the drop probability, $p_d$, every Δt units of time. Therefore, Δt is the sampling/control interval of the system. The control system will now be described in discrete time.

Assuming again that $q_i(n)$ denotes the actual queue size of port (or class) i, wherein i=1,2, . . . , K, at discrete time n, wherein n=1Δt, 2Δt, 3Δt, . . . , it is now assumed that T denotes the target buffer occupancy. What is desired is a determination of a drop probability, $p_{d,i}$, which will push the queue size of port (or class) i, to this target buffer occupancy. So $p_{d,i}$ is adapted to react to the actual queue dynamics experienced at the node using a simple control mechanism: if the actual queue size, $q_i$, is smaller than the target queue size, T, $p_{d,i}$ is decreased to make aggressive usage of the available resources, and vice versa if the actual queue size is high.

The goal of the controller is therefore to adapt $p_{d,i}$ so that the magnitude of the error signal, $$e_i(n) = q_i(n) - T,\ i = 1, 2, \ldots, K,$$

is kept as small as possible. Due to the burstiness of the network traffic and other perturbations, this error signal is highly fluctuating, so that some low pass filtering is desirable.

The first part of the controller is a discrete-time first-order low-pass filter with gain 0<β<1. The filtered error signal is given by, $$\hat{e}_i(n) = (1-\beta)\hat{e}_i(n-1) + \beta e_i(n),\ i=1,2,\ldots,K.$$

The second part of the controller is then the incremental adaptation of the drop probability, $p_d$, proportional to the filtered error signal, $$p_{d,i}(n) = p_{d,i}(n-1) + \alpha \hat{e}_i(n),\ i=1,2,\ldots,K,$$

where α is a control gain. Note that $p_{d,i}(n)$ is always bounded by 0≤$P_{d,i}(n)$≤1, for all n. The basic recursion $p_d(n)=p_d(n-1)+\alpha e(n)$ (omitting the index i) implements the standard summation or integral control scheme since $\Delta p_d(n) = p_d(n) - p_d(n-1) = \alpha e(n)$ or $p_d(n) = \alpha \Sigma_{i=0}^{n} e(i)$, in discrete-time (and $dp_d(t)/dt = \alpha e(t)$ or $p_d(t) = \alpha \int_0^t e(\tau) d\tau$, in continuous-time).

In the present invention, the normalized error signal is used instead, thus the control equation is expressed as, $$p_{d,i}(n) = p_{d,i}(n-1) + \alpha \frac{\hat{e}_i(n)}{2T},\ i = 1, 2, \ldots, K,$$

where the denominator 2T serves only as a normalization parameter. Note also that filtering the error signal, $e_i(n)$, is equivalent to filtering the sampled queue size, $q_i(n)$, for constant T, thus, the control equation can also be expressed as, $$p_{d,i}(n) = p_{d,i}(n-1) + \alpha \left[ \frac{\hat{q}_i(n) - T}{2T} \right],\ i = 1, 2, \ldots, K,$$

where $\hat{q}_i(n)$ denotes the filtered queue size of port (or class) i. Filtering of the error signal, $e_i$, or queue size, $q_i$, also has the important benefit of allowing traffic bursts to be queued without being unnecessarily discarded. This is because congestion is detected by comparing the average queue size to a predetermined threshold. In effect, only the average queue size is controlled, allowing transient traffic bursts to be accommodated in the queue.

In sum, the following parameters affect the control performance:

Sampling intervals (Δt and Δs): Δt and Δs are the time intervals for taking measurements and applying the computed $p_d$ and T controls, respectively, e.g., Δt=10 packet transmission time and Δs=100 msec.

Control gain (α): This controls the reaction speed and stability of the control system. The recommended value when measurements are done on a packet by packet basis is α=0.00005.

Filter gain (β): This controls the reaction speed of the filter. The recommended value is β=0.002.

Control target (i.e., computed common buffer threshold, T): This sets the average buffer utilization level and average queuing delay, since the average queue size evolves around this value.

Buffer size (B): This is the buffer size allocated to the connections or flows anticipated in the system and is an issue related to buffer dimensioning and traffic engineering. The buffer size, B, influences packet losses and system utilization level and is typically selected to be at least equal to a bandwidth-delay product worth of data.

"No-drop" threshold (L): This is a threshold lower than T, below which no packets are dropped even though $p_d$ can be greater than zero. This helps to maintain high link utilization and keep the average queue size around the target level. The "no-drop" threshold, L, should always be a little lower than T, i.e., L=bT, wherein b ∈[0.8,0.9]. The recommended value is L=0.9T.

Figure 5:
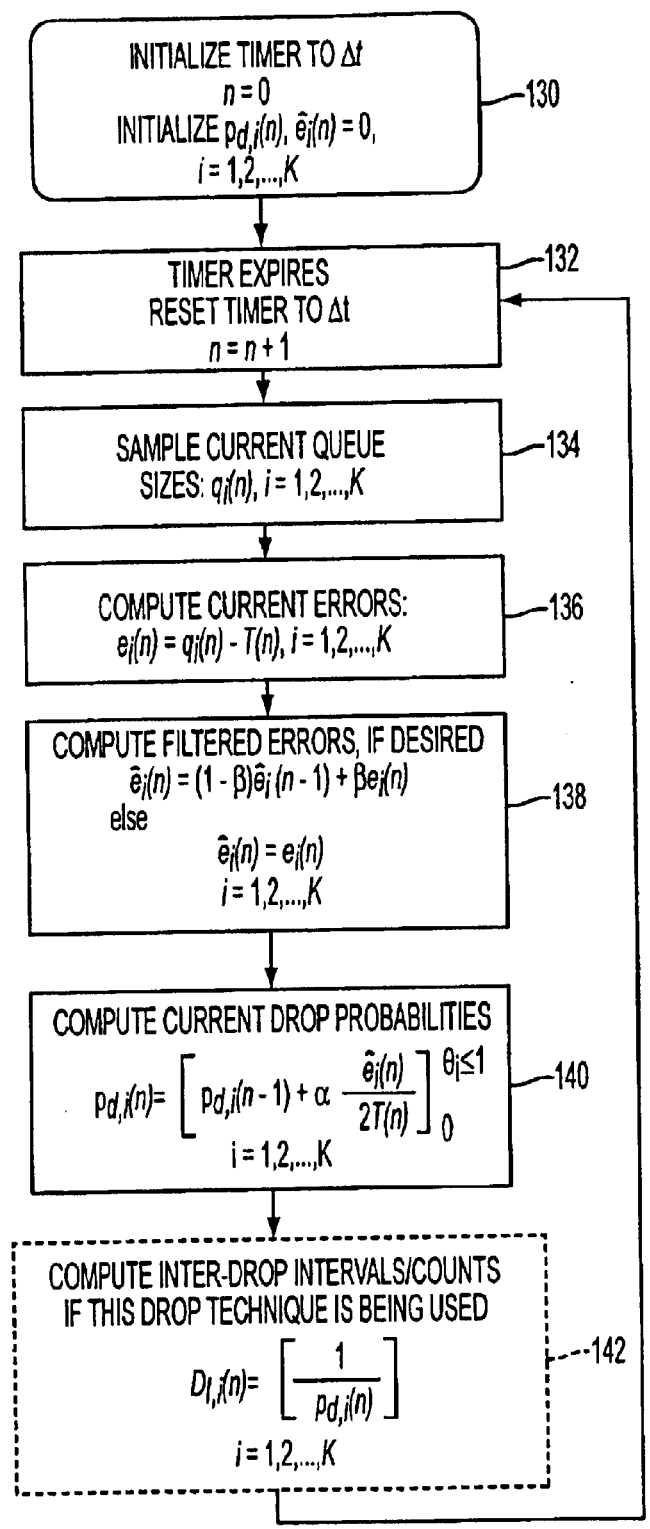
FIG. 5 is a flowchart illustrating the steps involved in the computation of packet drop probabilities in accordance with the present invention.

The computations of the packet drop probabilities are illustrated in FIG. 5. In step 130, the timer, the drop probabilities, and the error signal are all initialized. In step 132, the timer expires and the timer is reset. In step 134, the queue sizes are sampled. In step 136, the current error signals are computed using the current common threshold, T(n). In step 138, the filtered error signals are computed (if desired). In step 140, the current drop probabilities are computed. Upper bounds on the drop probabilities can be introduced by selecting the appropriate limits, $\theta_i \leq 1$, wherein i=1,2, ..., K. In step 142, the inter-drop intervals/counts (to be described later) are computed if the appropriate drop technique is adopted at the queue.

The drop probabilities, $p_{d,i}(n)$, wherein i=1,2, ... K, are used until time, n+1, when new drop probabilities are computed. The error signals, $ê_i(n)$, wherein i=1,2, ..., K, and the drop probabilities, $p_{d,i}(n)$, wherein i=1,2, ..., K, are stored to be used at time, n+1.

Figure 6:
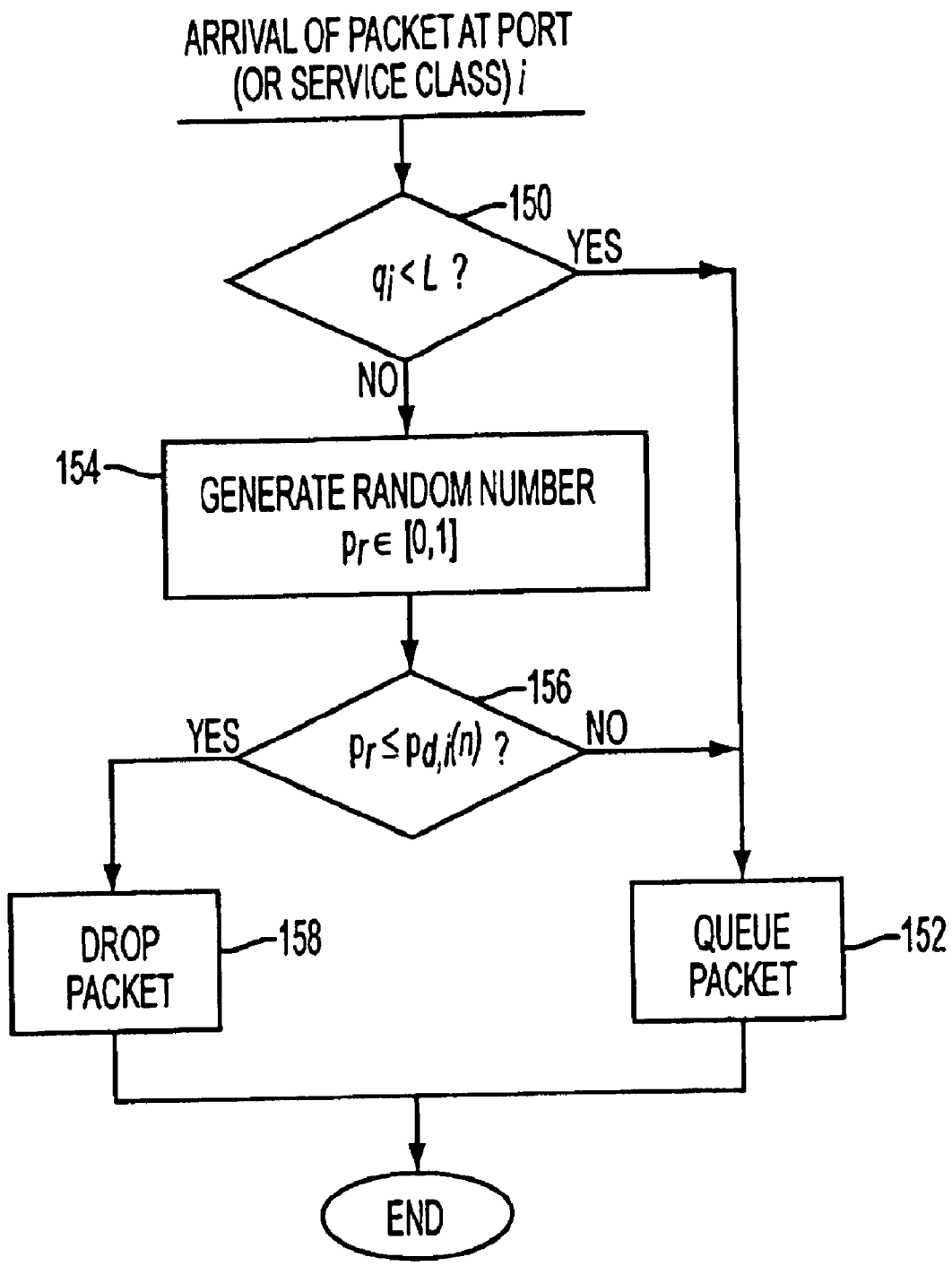
FIG. 6 is a flowchart illustrating the steps involved in dropping data packets according to a random number generator approach.

In the packet drop routine component 106, the final determination is made as to whether a received data packet is dropped or accepted. In this detailed description, two approaches for dropping data packets at the queue are described: a random number generator approach and an inter-drop interval/count approach. In the random number generator approach, which is illustrated in FIG. 6, the decision to accept or drop an incoming packet in the random number generator approach is mainly based on the outcome of a comparison of a randomly generated number, $p_r \in [0,1]$, and the drop probability, $p_{d,i}$. In step 150, a decision is made as to whether a queue size is less than the "no-drop" threshold, L. If yes, in step 152, the incoming packet is accepted. If no, in step 154, a random number is generated. Then, in step 156, a decision is made as to whether the generated random number is less or equal to the drop probability. If no, in step 152, the incoming packet is accepted. If yes, in step 158, the incoming packet is dropped.

The parameter L (wherein L<T) is introduced in the control process to help maintain high link utilization and keep the queue size around the target level. The drop controller does not drop packets when $q_i(n)<L$ in order to maintain high resource utilization and also not to further penalize sources which are in the process of backing off in response to (previous) packet drops. Note that there is always a time lag between the time a packet is dropped and the time a source responds to the packet drop. The computation of $p_{d,i}$, however, still continues even if packet dropping is suspended (when $q_i(n)<L$).

Figure 7:
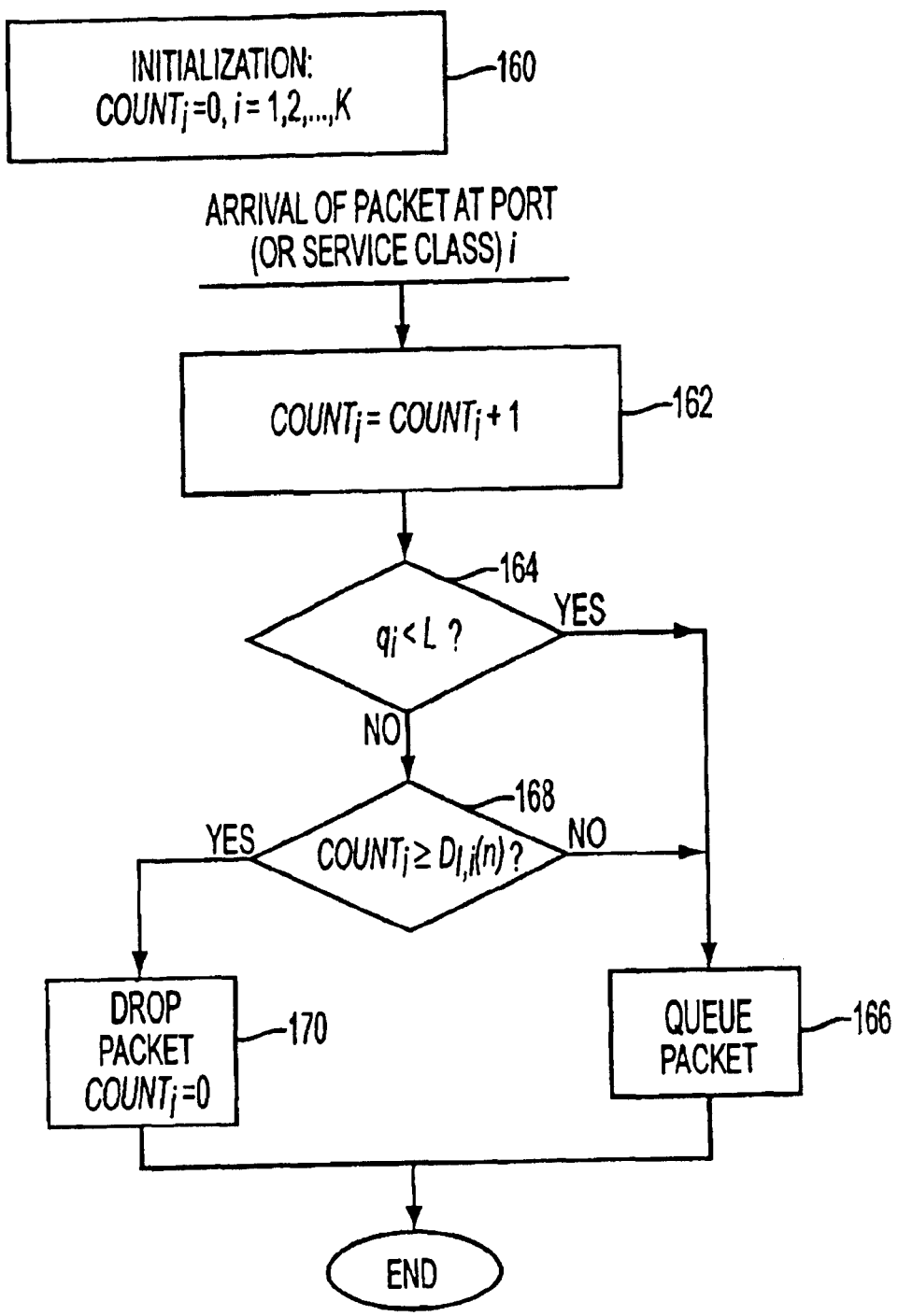
FIG. 7 is a flowchart illustrating the steps involved in dropping data packets according to an inter-drop interval/count approach.

An alternative to the random number generator approach is to use a simple count mechanism based on the drop probability values. The use of the drop probability metric gives a good indication of the amount of packets that should be dropped in order to achieve a given loss rate. As a result, the inverse of a drop probability value indicates the interval in packets until the next packet drop. That is, the inverse of the drop probability gives an inter-drop interval/count. For instance, for a drop probability, $p_{d,i}$, the inter-drop interval/count, $D_{I,i} = \lfloor 1/p_{d,i} \rfloor$, indicates that one out of every $D_{I,i}$ packets should be dropped. A simple implementation of such a inter-drop interval/count drop approach is illustrated in FIG. 7. In step 160, the count is initialized. In step 162, the count is incremented when a data packet arrives. In step 164, a decision is made as to whether the current queue size is less than the "no-drop" threshold. If yes, in step 166, the incoming packet is accepted. If no, in step 168, a decision is made as to whether the current count is greater than the current inter-drop interval/count. If no, in step 166, the incoming packet is accepted. If yes, in step 170, the incoming packet is dropped.

In view of the foregoing, it is apparent that, in a shared-memory architecture, a buffer management scheme is needed to ensure the fair share of memory among different port (or service class) queues. While static partitioning provides firewalls between ports (or classes), dynamic partitioning of buffer leads to better efficiency. The present invention provides a buffer management scheme for a shared-memory architecture where dynamic thresholds are used to ensure efficient and fair usage of buffer memory. The present invention buffer management scheme logically divides and allocates buffer memory to multiple queues, and ensures the fair and optimal sharing of buffer memory to changing traffic conditions at port or service class levels. The present invention buffer management scheme can be employed in any number of network devices (e.g., router, switch, etc.) having a shared buffer where the buffer is logically organized into multiple queues. The present invention buffer management scheme, which uses dynamic buffer thresholds, adapts to changing load conditions, and dynamically allocates buffer space to all queues in a recursive fashion. The implementation of the present invention buffer management scheme is also simple and requires low processing overhead to compute the dynamic queue thresholds and packet drop probabilities.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present invention as disclosed herein.

What is claimed is:

1. An improved buffer management process, wherein the buffer is shared among a plurality of packet queues, the improvement comprising:

computing a common queue threshold value based at least in part on the aggregate size of the plurality of packet queues and a predetermined buffer threshold value; and computing a packet drop probability for each of the plurality of packet queues based at least in part on the common queue threshold value;

wherein the common queue threshold value and the respective packet drop probability are used to manage the size of each of the plurality of packet queues and thereby manage the buffer.

2. The improved buffer management process as defined in claim 1, wherein the improvement further comprises:

recomputing the common queue threshold value at predetermined time intervals.

3. The improved buffer management process as defined in claim 1, wherein the improvement further comprises:
recomputing the packet drop probability for each of the plurality of packet queues based at least in part on the common queue threshold value.

4. The improved buffer management process as defined in claim 1, wherein a predetermined increment threshold value is used to compute the common queue threshold value.

5. The improved buffer management process as defined in claim 4, wherein the computed common queue threshold value is the smaller of the sum of a current common queue threshold value and the predetermined increment threshold value or the predetermined buffer threshold value if the aggregate size of the plurality of packet queues is less than the predetermined buffer threshold value.

6. The improved buffer management process as defined in claim 4, wherein the computed common queue threshold value is the larger of the difference of a current common queue threshold value and the predetermined increment threshold value or a predetermined minimum queue threshold value if the aggregate size of the plurality of packet queues is greater than or equal to the predetermined buffer threshold value.

7. The improved buffer management process as defined in claim 7, wherein the size of each of the plurality of packet queues is managed based at least in part on determining whether to drop one or more packets based at least in part on a comparison of the respective drop probability to a reference value.

8. The improved buffer management process as defined in claim 7, wherein the reference value includes a randomly generated value.

9. The improved buffer management process as defined in claim 7, wherein the reference value represents a number of packets to be admitted into the respective packet queue between dropped packets.

10. An improved buffer management apparatus, wherein the buffer is shared among a plurality of packet queues, the improvement comprising:
at least one threshold computation processor for computing a common queue threshold value based at least in part on the aggregate size of the plurality of packet queues and a predetermined buffer threshold value; and
at least one packet drop probability computation processor for computing a packet drop probability for each of the plurality of packet queues based at least in part on the common queue threshold value;
wherein the common queue threshold value and the respective packet drop probability are used to manage the size of each of the plurality of packet queues and thereby manage the buffer.

11. The improved buffer management apparatus as defined in claim 10, wherein the at least one threshold computation processor recomputes the common queue threshold value at predetermined time intervals.

12. The improved buffer management apparatus as defined in claim 10, wherein the at least one packet drop probability computation processor recomputes the packet drop probability for each of the plurality of packet queues at predetermined time intervals.

13. The improved buffer management apparatus as defined in claim 10, wherein a predetermined increment threshold value is used to compute the common queue threshold value.

14. The improved buffer management apparatus as defined in claim 13, wherein the computed common queue threshold value is the smaller of the sum of a current common queue threshold value and the predetermined increment threshold value or the predetermined buffer threshold value if the aggregate size of the plurality of packet queues is less than the predetermined buffer threshold value.

15. The improved buffer management apparatus as defined in claim 13, wherein the computed common queue threshold value is the larger of the difference of a current common queue threshold value and the predetermined increment threshold value or a predetermined minimum queue threshold value if the aggregate size of the plurality of packet queues is greater than or equal to the predetermined buffer threshold value.

16. The improved buffer management apparatus as defined in claim 10, wherein the size of each of the plurality of packet queues is managed based at least in part on determining whether to drop one or more packets based at least in part on a comparison of the respective drop probability to a reference value.

17. The improved buffer management apparatus as defined in claim 16, wherein the reference value includes a randomly generated value.

18. The improved buffer management apparatus as defined in claim 16, wherein the reference value represents a number of packets to be admitted into the respective packet queue between dropped packets.

19. An article of manufacture for improving a buffer management process, wherein the buffer is shared among a plurality of packet queues, the article of manufacture comprising:
at least one processor readable carrier; and
instructions carried on the at least one carrier;
wherein the instructions are configured to be readable from the at least one carrier by at least one processor and thereby cause the at least one processor to operate so as to:
compute a common queue threshold value based at least in part on the aggregate size of the plurality of packet queues and a predetermined buffer threshold value; and
compute a packet drop probability for each of the plurality of packet queues based at least in part on the common queue threshold value;
wherein the common queue threshold value and the respective packet drop probability are used to manage the size of each of the plurality of packet queues and thereby manage the buffer.

20. The article of manufacture as defined in claim 19, wherein the instructions further cause the at least one processor to operate so as to:
recompute the common queue threshold value at predetermined time intervals.

21. The article of manufacture as defined in claim 19, wherein the instructions further cause the at least one processor to operate so as to:
recompute the packet drop probability for each of the plurality of packet queues based at least in part on the common queue threshold value.

22. The article of manufacture as defined in claim 19, wherein a predetermined increment threshold value is used to compute the common queue threshold value.

23. The article of manufacture as defined in claim 22, wherein the computed common queue threshold value is the smaller of the sum of a current common queue threshold value and the predetermined increment threshold value or the predetermined buffer threshold value if the aggregate size of the plurality of packet queues is less than the predetermined buffer threshold value.

24. The article of manufacture as defined in claim 22, wherein the computed common queue threshold value is the larger of the difference of a current common queue threshold value and the predetermined increment threshold value or a predetermined minimum queue threshold value if the aggregate size of the plurality of packet queues is greater than or equal to the predetermined buffer threshold value.

25. The article of manufacture as defined in claim 13, wherein the size of each of the plurality of packet queues is managed based at least in part on determining whether to drop one or more packets based at least in part on a comparison of the respective drop probability to a reference value.

26. The article of manufacture as defined in claim 25, wherein the reference value includes a randomly generated value.

27. The article of manufacture as defined in claim 25, wherein the reference value represents a number of packets to be admitted into the respective packet queue between dropped packets.

28. An improved buffer management apparatus, wherein the buffer is shared among a plurality of packet queues, the improvement comprising:

means for computing a common queue threshold value based at least in part on the aggregate size of the plurality of packet queues and a predetermined buffer threshold value; and means for computing a packet drop probability for each of the plurality of packet queues based at least in part on the common queue threshold value;

wherein the common queue threshold value and the respective packet drop probability are used to manage the size of each of the plurality of packet queues and thereby manage the buffer.

* * * * *